United States Patent Office 3,561,925
Patented Feb. 9, 1971

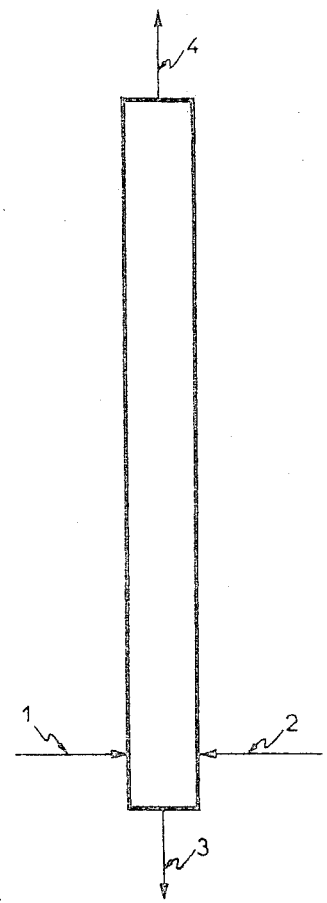

3,561,925
PRODUCTION OF AMMONIA AND SULFUR FROM AMMONIUM SULFITES OR SULFIDES
André Deschamps, Chatou, and Philippe Renault, Neuilly-sur-Seine, France, assignors to Institut Francais du Petrole des Carburants et Lubrifiants, Rueil, Malmaison, Hauts-de-Seine, France
Filed June 20, 1968, Ser. No. 738,471
Claims priority, application France, June 26, 1967, 111,962
Int. Cl. C01b 17/02; C01c 1/10
U.S. Cl. 23—226                    6 Claims

ABSTRACT OF THE DISCLOSURE

A process for manufacturing ammonia and sulfur which comprises reacting ammonium sulfite or ammonium sulfide with, respectively, a gas containing hydrogen sulfide or sulfur dioxide, at a temperature of about 90 to 180° C. in the presence of a liquid phase containing at least 10% by weight of a compound selected from the group consisting of higher alcohols, polyols, mono- and polyalkylene glycols, esters and ethers of the alcohols, polyols and glycols and phosphoric esters, and recovering sulfur therefrom as well as water and ammonia in the gaseous state.

---

The purification of gaseous effluents containing $H_2S$ or $SO_2$ in a diluted state may be carried out by injection of ammonia usually followed by a washing with water, or by washing of these gaseous effluents with an aqueous solution of ammonia.

In order that this operation may be economical, ammonia must be regenerated from the thus obtained solutions of ammonium sulfides or sulfites and the sulfur compound must be recovered under a useful form.

The process of this invention has for object to regenerate ammonia and to convert the acidic constituent of the salt into elemental sulfur. According to this process, the ammonium sulfite or sulfide is reacted with a substantially stoichiometrical amount of, respectively, hydrogen sulfide or sulfur dioxide in order that the following reactions may take place:

$$(NH_4)_2SO_3 + 2H_2S \rightarrow 3S + 3H_2O + 2NH_3 \quad (I)$$
$$2(NH_4)_2S + SO_2 \rightarrow 3S + 2H_2O + 4NH_3$$

The stoichiometrical amount is thus 2 moles of hydrogen sulfide for 1 mole of ammonium sulfide in the case of reaction (I) and one mole of sulfur dioxide per 2 moles of ammonium sulfide, in the case of reaction (II). The stoichiometrical amount is the same with acidic sulfides or sulfites.

Preferably, the conversion of ammonium sulfide or sulfite to sulfur and ammonia is carried out in the presence of a liquid phase containing at least 10% by weight, and more preferably from 20 to 100%, of a compound chosen from the two following groups:

(1) Higher alcohols advantageously containing 4–30 and preferably 8–20 carbon atoms, polyols (polyhydroxy saturated hydrocarbons) of 2–30 and preferably 8–20 carbon atoms, also containing 2–5 OH groups per molecule, carboxylic esters and/or ethers of these alcohols and polyols.

The following compounds of the mono- or polyalkylene glycol type will be preferred:

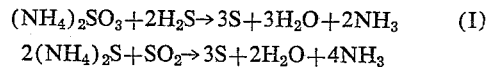

where $R_1$ and $R_3$, same or different, are hydrogen atoms, monovalent hydrocarbon radicals of 1–20 and preferably 1–5 carbon atoms, monovalent radicals of formula R′ CO where R′ is a monovalent hydrocarbon radical, such as alkyl of 1–20 and preferably 1–5 carbon atoms; $R_2$ which may be same or different, are bivalent hydrocarbon radicals of 2–10 and preferably 2–5 carbon atoms, advantageously linear or branched alkylene radicals; and $n$ is an integer from 1 to 50, preferably 5 to 20.

(2) Phosphoric esters of the general formula PO (OR$_3$) where the R radicals which may be same or different, are monovalent hydrocarbon radicals containing 1–20 and preferably 3–10 carbon atoms, such as alkyl, cycloalkyl and aryl, or radicals of the formula

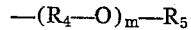

where $R_4$ is a bivalent hydrocarbon rest of 2 or 3 carbon atoms, $R_5$ is a hydrogen atom or a hydrocarbon rest of 1–5 carbon atoms and $m$ is an integer of 1, 2 or 3.

In this second class of solvents, there are preferred the esters having a solubility in water lower than 1% by weight at 20° C. and a dissolving power for water lower than 7% by weight at 20° C.

The number of carbon atoms given hereabove must be considered as non-limitative.

As non-limitative examples of compounds of these groups, the following may be named:

(1) hexanol, 1,4-hexanediol, heptanol acetate, butyl ether, glycol, tetraethylene glycol, octaethylene glycol, polyethyleneglycol of molecular weight of about 200–400, tripropyleneglycol, diethyl ether of diethyleneglycol, monobutyl ether of dipropyleneglycol, 2-(2-butoxyethoxy) ethyl acetate.

(2) tributyl ester of orthophosphoric acid, triisobutyl ester of orthophosphoric acid, tricresyl ester of orthophosphoric acid, di-n-butyl-cyclohexyl orthophosphate, tri(2-butoxy ethyl)phosphate.

The liquid phase in the presence of which is preferably carried out the reaction may comprise water and optionally low amounts of additional solvents.

The conversion of ammonium sulfides or sulfites to sulfur and ammonia, according to this invention, may be carried out at a temperature which, if the atmospheric pressure is used, will be at least 90° C. and for example between 100 and 140° C. according to the nature of the liquid phase which is used as reaction phase. Usually 180° C. will not be overpassed.

It is also possible, although less preferred, to operate at a pressure lower or higher than the atmospheric pressure.

As a rule, the reaction will be carried out at a temperature which will not be lower by more than 10° C. than the boiling point of water under the selected pressure. Preferably the reaction temperature will be at least this boiling temperature at this same pressure.

Ammonium sulfite or sulfide may be used in the solid or liquid state, for example as a solution in water or in diluted aqueous ammonia. The necessary additional gas, $H_2S$ or $SO_2$, may be introduced pure or diluted in a gas such as nitrogen.

In this invention, by sulfite there is meant both the so-called sulfite and the bisulfite or a mixture of these. The same observation may be made with respect to the sulfide. It is then possible to treat according to this invention both the solutions of sulfide or bisulfide, or solutions containing a mixture of these, which is usually the case.

In the case of ammonium bisulfite or bisulfide, the reactions are the following:

$$H(NH_4)SO_3 + 2H_2S \rightarrow 3S + 3H_2O + NH_3 \quad (III)$$
$$2H(NH_4)S + SO_2 \rightarrow 3S + 2H_2O + 2NH_3 \quad (IV)$$

It is thus clear that the stoichiometrical amounts are the same as in reactions I and II respectively.

As a modification of this process, the salt (ammonium sulfite or sulfide) to be converted to sulfur and ammonia may be contacted with another salt (respectively ammonium sulfite or sulfide), one or the two salts introduced into the liquid phase defined herebelow being initially solid or dissolved in a solvent, for example water.

In all cases, such a process allows recovering sulfur in crystallized or melted form, according to the temperature, whereas ammonia and water are withdrawn as vapor.

Any apparatus allowing contact between a gas and a liquid may be used to carry out the reaction, for example a column with plates or packing, the liquid phase being still or circulating.

An example of apparatus is shown on the figure of the drawing. The sulfide or sulfite, for example in the form of an aqueous solution, is injected through pipe 1 at the bottom of a packed column which has been filled with solvent, for example a phosphoric ester. Through line 2, there is introduced at the bottom of this column a substantially stoichiometrical amount of $SO_2$ or $SH_2$, according to the nature of the treated solution: ammonium sulfite or sulfide. According to another embodiment, an ammonium sulfite or sulfide may be injected, for example in the form of an aqueous solution, through pipe 2.

The formed sulfur separates; it is withdrawn from the lower part of the column through pipe 3. Ammonia and water resulting from the reaction escape as vapor through line 4 from the top of the column.

If one of the reactants, for example $SO_2$, is in excess it will be withdrawn from the top of the column together with ammonia and steam. It will be advantageously recycled, for example as ammonium sulfite, after cooling of the gaseous effluent from the column.

The following non-limitative examples illustrate this invention:

EXAMPLE 1

From the bottom of a packed column containing 500 ccm. of tri(2-butoxy ethyl) phosphate maintained at 106° C. there is injected at a rate of 100 ccm. per hour an aqueous solution of neutral ammonium sulfite $(NH_4)_2SO_3$ at a concentration of 2 moles per liter. $H_2S$ is introduced at the bottom of the column at a rate of 9 liters per hour, together with nitrogen (90 liters per hour).

The conversion rate of the sulfite is 90% and may be easily increased by varying the operating conditions such as, for example, the dimensions of the packed column, its efficacy, the rate of the feed solution and the like. Sulfur is recovered in the crystalline form at the basis of the apparatus. No by-product could be detected such as sulfate or thiosulfate.

EXAMPLE 2

Example 1 is repeated, operating at 120° C. with an injection rate of 150 cm.³ per hour of a 2 moles per liter aqueous solution of ammonium bisulfide. $SO_2$ is introduced from the bottom of the column at a rate of 3.4 liters per hour, diluted in nitrogen (30 liters per hour).

Sulfur is recovered in the liquid state from the basis of the column. The conversion rate is 100% and the yield of sulfur is quantitative since no by-product may be detected.

EXAMPLE 3

Example 2 is repeated, however replacing tri(2-butoxy ethyl) phosphate by 500 cm.³ of polyethyleneglycol of molecular weight about 400. All other conditions remaining unchanged, the same results as in Example 2 are obtained.

EXAMPLE 4

Example 2 is repeated, however replacing the solvent by 500 cm.³ of triisobutyl phosphate. Substantially same results as in Example 2 are obtained.

What is claimed is:

1. In a process for manufacturing sulfur which comprises reacting an ammonium sulfite or ammonium sulfide with, respectively, a gas containing hydrogen sulfide or sulfur dioxide, the improvement which comprises conducting the process at a temperature of about 90 to 180° C. in the presence of a liquid phase containing at least 10% by weight of a compound selected from the group consisting of higher alcohols, polyols, mono- and polyalkylene glycols, esters and ethers of the alcohols, polyols and glycols and phosphoric esters of the general formula $PO(OR)_3$ wherein R is an alkyl, cycloalkyl or aryl monovalent hydrocarbon radical containing 1 to 20 carbon atoms, or a radical of the formula $-(R_4-O)_m-R_5$ in which $R_4$ is a hydrocarbon radical containing 2 to 3 carbon atoms, $R_5$ is a hydrogen atom or a hydrocarbon radical containing 1 to 5 carbon atoms and $m$ is a number from 1 to 3, and recovering sulfur therefrom as well as water and ammonia in the gaseous state.

2. The process of claim 1, wherein the mono- and polyalkylene glycols are of the general formula $R_1-O-(R_2-O)_n-R_3$, wherein $R_1$ and $R_3$ are selected from the group consisting of hydrogen, a monovalent hydrocarbon radical containing 1 to 20 carbon atoms and a monovalent radical of the formula $R'CO-$ wherein $R'$ is a monovalent hydrocarbon radical containing 1 to 20 carbon atoms, $R_2$ is a bivalent hydrocarbon radical containing 2 to 10 carbon atoms and $n$ is a number from 1 to 50.

3. The process of claim 1, wherein ammonium sulfite and ammonium sulfide are used as an aqueous solution.

4. The process of claim 1, wherein the ammonium sulfide or ammonium sulfite is obtained from washing a gas containing, respectively, hydrogen sulfide or sulfur dioxide with an aqueous solution of ammonia.

5. The process of claim 1, wherein ammonia and sulfur is manufactured from ammonium bisulfite or ammonium bisulfide.

6. The process of claim 1, wherein the liquid phase is selected from the group consisting of tri(2-butoxy ethyl) prosphate, polyethylene glycol and triisobutyl phosphate.

References Cited

UNITED STATES PATENTS

| | | | |
|---|---|---|---|
| 1,011,043 | 12/1911 | Feld | 24—225 |
| 1,795,120 | 3/1931 | Hansen | 23—225 |
| 2,863,732 | 12/1958 | Bowers et al. | 23—224 |
| 3,428,426 | 2/1969 | Carney | 23—193 |
| 3,431,070 | 3/1969 | Keller | 23—225X |
| 3,441,379 | 4/1969 | Renault | 23—226 |

FOREIGN PATENTS

| | | | |
|---|---|---|---|
| 307,903 | 3/1930 | Great Britain | 23—225 |
| 363,848 | 12/1931 | Great Britain | 23—225 |

OSCAR R. VERTIZ, Primary Examiner

G. O. PETERS, Assistant Examiner

U.S. Cl. X.R.

23—193, 224